United States Patent Office.

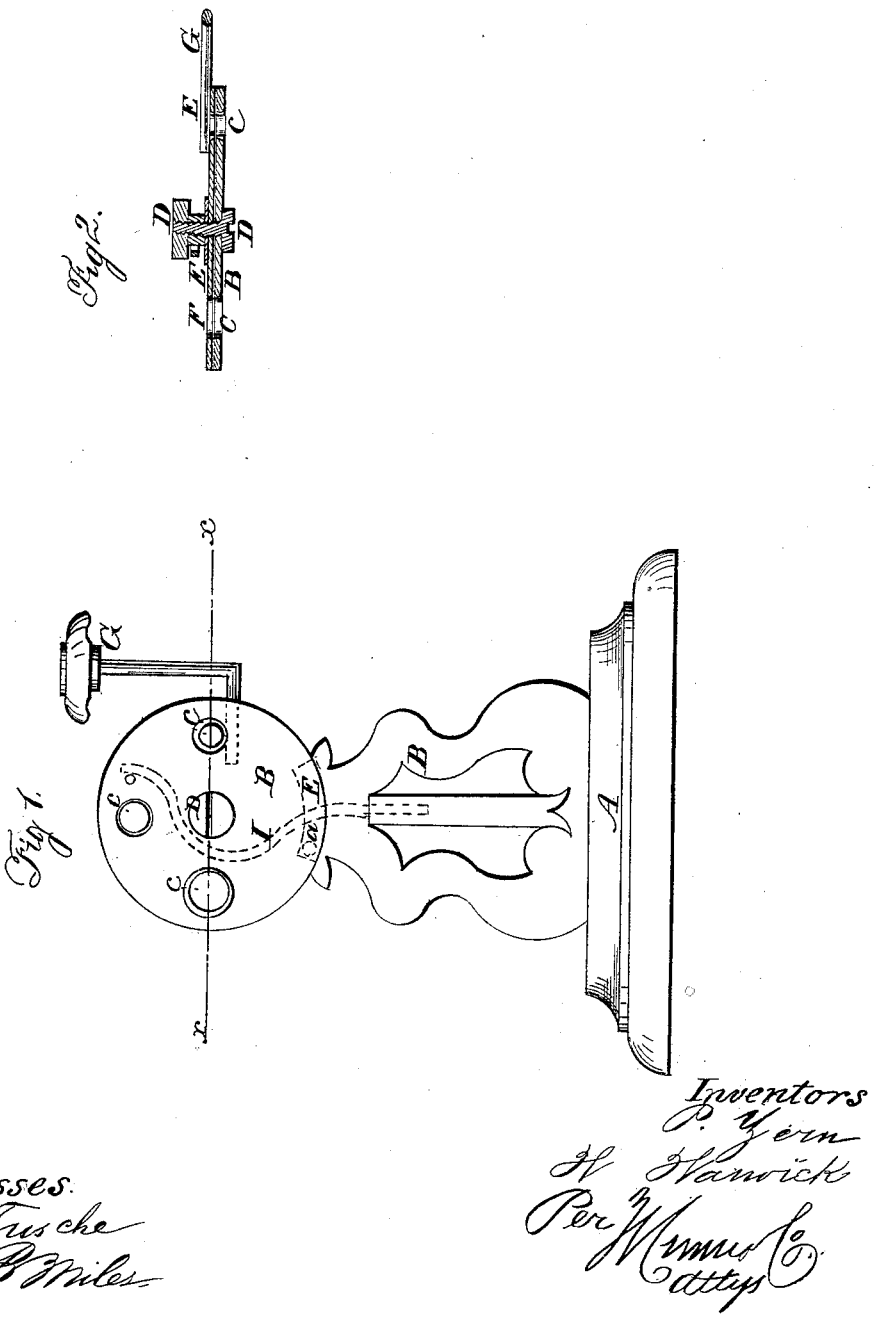

P. ZERN AND W. WARWICK, OF PITTSBURG, PENNSYLVANIA.

Letters Patent No. 65,325, dated May 28, 1867.

MACHINE FOR CUTTING OFF CIGARS.

The Schedule referred to in these Letters Patent and making part of the same.

TO ALL WHOM IT MAY CONCERN:

Be it known that we, P. ZERN and W. WARWICK, of Pittsburg, in the county of Allegheny, and State of Pennsylvania, have invented a new and improved Machine for Cutting Off Cigars, and that the following description, taken in connection with the accompanying drawings hereinafter referred to, forms a full and exact specification of the same, wherein we have set forth the nature and principles of our said improvements, by which our invention may be distinguished from all others of a similar class, together with such parts as we claim and desire to have secured to us by Letters Patent.

The present invention relates to a machine for cutting off the ends or tips to cigars, when to be smoked, in lieu of biting them, as has heretofore been the custom, the disadvantages of which, in the breaking away of the cigar, are well known. By the present machine, the cigar tip or tips, while being cut, are held in such a manner that the knife or cutting edge, when brought down over it or them, cannot possibly break away the cigar, but will produce a perfectly smooth and even cut.

In the accompanying plate of drawings, our improved machine for cutting off the tips or ends to cigars is illustrated—

Figure 1 being a front elevation of the same; and

Figure 2, a section taken in the plane of the line $x\,x$, fig. 1.

A, in the drawings, represents the stand or base to the machine, to which base is secured an upright plate, B. In this plate is a series of circular holes or openings, C, around a common centre-pin, D, these holes being made of different sizes to accommodate the varying sizes to the ends or tips of cigars. E, a plate hung to turn upon centre-pin D, against and in contact with which it turns. This plate is provided with holes, F, corresponding in position to those of the plate B, and with a knob or handle, G, for convenience in turning it, the circular motion of which is limited by the ends of its cut-out portion, H, and a stud or pin, $a$, fixed in the upright plate B. I, a bent or curved spring for throwing back the circular plate E, after each turn of the same by depressing the knob G. The edges of the circular openings in the plates B and E are made so as to cut the tip or end of a cigar inserted therein, when the plate is revolved or turned by depressing its knob or handle G.

Having thus described our invention, we claim as new, and desire to secure by Letters Patent—

The combination of the upright B with opening C and plate E, having similar openings, when the two are arranged and combined together substantially as and for the purpose described.

P. ZERN,
WM. WARWICK.

Witnesses:
JAMES A. BELL,
DAVID RICHARDS.